(12) United States Patent
Nishida et al.

(10) Patent No.: US 6,591,190 B2
(45) Date of Patent: Jul. 8, 2003

(54) NAVIGATION SYSTEM

(75) Inventors: Sosuke Nishida, Kawagoe (JP); Masato Kazama, Tokyo-to (JP)

(73) Assignees: Pioneer Corporation, Tokyo-to (JP); Increment P Corporation, Tokyo-to (JP)

( * ) Notice: Subject to any disclaimer, the term of this patent is extended or adjusted under 35 U.S.C. 154(b) by 0 days.

(21) Appl. No.: 09/842,012

(22) Filed: Apr. 26, 2001

(65) Prior Publication Data
US 2001/0037177 A1 Nov. 1, 2001

(30) Foreign Application Priority Data
Apr. 28, 2000 (JP) ......................................... 2000-131640

(51) Int. Cl.[7] .............................................. G01S 21/00
(52) U.S. Cl. ...................... 701/211; 701/200; 701/208; 345/419; 345/425; 345/433
(58) Field of Search .................................. 701/211, 200, 701/201, 208; 345/425, 433, 419

(56) References Cited

U.S. PATENT DOCUMENTS

| | | | | |
|---|---|---|---|---|
| 5,844,218 A | * | 12/1998 | Kawan et al. | 235/380 |
| 6,144,318 A | | 11/2000 | Hayashi et al. | 340/995 |
| 6,201,544 B1 | | 3/2001 | Ezaki | 345/419 |
| 6,324,467 B1 | * | 11/2001 | Machii et al. | 701/200 |
| 6,324,469 B1 | * | 11/2001 | Okude et al. | 701/208 |

FOREIGN PATENT DOCUMENTS

| | | |
|---|---|---|
| EP | 0 772 174 | 5/1997 |
| EP | 0 897 170 | 2/1999 |
| JP | 1132777 | 10/1997 |
| JP | 11305658 | 11/1999 |

* cited by examiner

*Primary Examiner*—William A. Cuchlinski, Jr.
*Assistant Examiner*—Marthe Y. Marc-Coleman
(74) *Attorney, Agent, or Firm*—Nixon & Vanderhye, P.C.

(57) ABSTRACT

A navigation system for displaying guidance in accordance with map data is provided. The navigation system includes a landmark displaying device for displaying structures corresponding to the map data as landmarks. The landmark displaying device sets reference positions in the landmarks and determines the location and direction of a landmark so that it would face to a road nearby.

24 Claims, 7 Drawing Sheets

FIG. 4
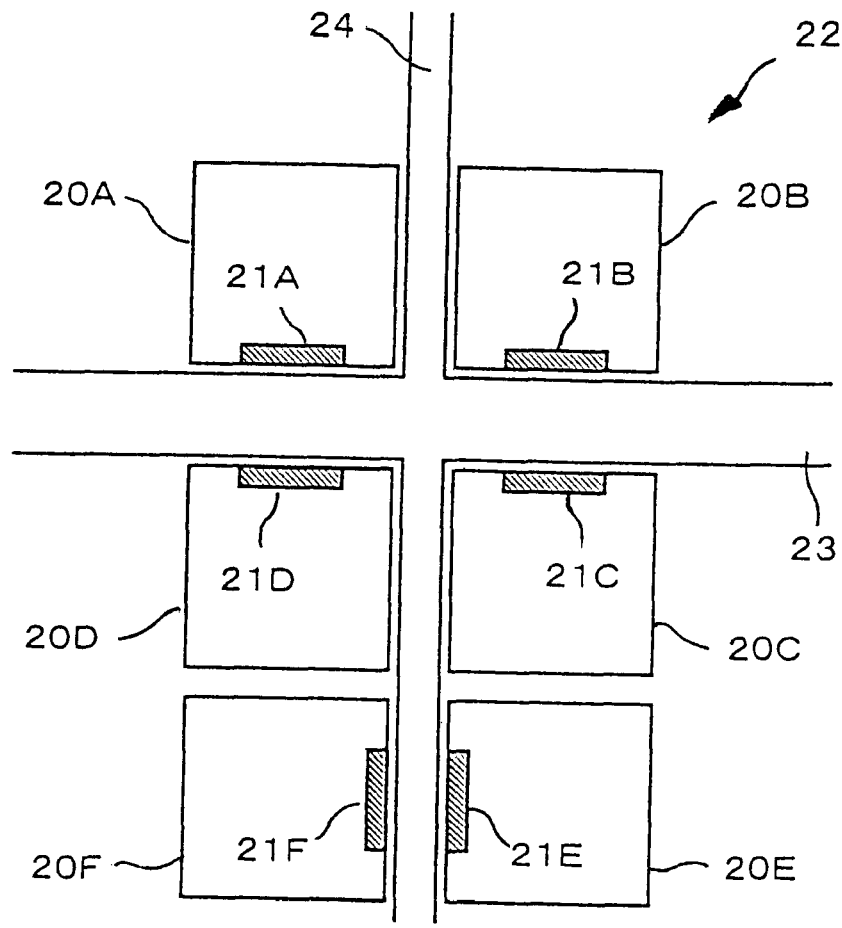
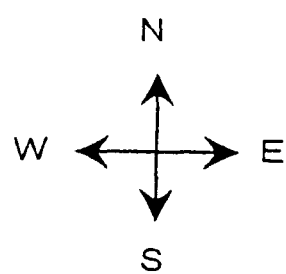

NAVIGATION SYSTEM

BACKGROUND OF THE INVENTION

1. Field of the Invention

The invention relates to a navigation system which displays a guidance based on map data, particularly, that displays on the screen conspicuous roadside structures and buildings as land marks.

2. Description of the Related Art

In recent years, functions in navigation systems have been highly enhanced, in which more multifarious guidance information became available on the screen to navigate drivers on motor vehicles. The guidance information to be displayed generally includes roads in the area of the current position and, in addition, land marks that correspond with roadside facilities and structures. If logos, for instance, to indicate certain facilities such as gas stations and convenience stores are provided and shown to be superimposed in the map, that would be helpful to the drivers in finding the land marks in the course of being navigated.

As recent image processing technology progresses, there are increasing needs for guidance information displayed to be more real. Therefore, it is desirable to use realistic land marks that depict the shapes of actual structures in addition to things like logos.

However, the screen may look awkward when a conventional logo-like land mark is replaced by realistic one. In other words, the land mark may be displayed off the road of actual location, or a part of the building such as an entrance to the building is not set facing the road, which would result in giving the user a strong sense of wrongness. There was a problem that screen configuration was not so simple when a realistic land mark was to be used as it needed to be set correctly in terms of location and direction of the building toward the road, while the angle or location to the road did not have to be set so accurately when the conventional logo-like land marks were used.

SUMMARY OF THE INVENTION

The invention, therefore, is designed in consideration of the aforementioned difficulty in order to achieve an objective of providing navigation system that could define the direction and location of land marks accurately toward nearby streets when using realistic land marks.

The above object of the present invention can be achieved by a navigation system of the present invention for displaying guidance in accordance with map data. The system includes a land mark displaying device for displaying structures corresponding to the map data as land marks. The land mark displaying device sets reference positions in the land marks and determines the location and direction of a land mark so that it would face to a road nearby.

According to the present invention, when the land mark is used to display guidance together with map data on a screen in a navigation system, the land mark displaying device sets the location and direction in relation to the reference position to be defined in a land mark. Then, the land mark displaying device displays the land mark arranged so that they come in contact with one of the roads nearby. Therefore, the land mark is displayed in an accurate arrangement with realistic direction and location to the road, and the visibility of the guidance display in the navigation system is upgraded.

In one aspect of the present invention, the landmark displaying device selects a road closest to the land mark when multiple roads exist in areas near to the land mark.

According to this aspect, when multiple roads exist in areas near to the land mark, the landmark displaying device arranges the land mark so that the reference position of the land mark comes to contact with the closest road. Thus, various structures expressed as land marks are arranged accurately on the road and the guidance displayed looks natural.

In another aspect of the present invention, the land mark displaying device sets the priority in accordance with the types of the roads and selects a road with the highest priority when multiple roads exist in areas near to the land mark.

According to this aspect, when multiple roads exist in areas near to the land mark, the land mark displaying device arranges the land mark so that the reference position of the land mark comes to contact with the road with the highest priority. Thus, various structures generally having a high possibility to be located on major roads, for instance, are arranged to depict the reality; thus the guidance displayed looks natural.

In another aspect of the present invention, the land mark includes three-dimensional land marks that three-dimensionally represent structures corresponding to the map data.

According to this aspect, by using the three-dimensional land marks, structures like various facilities are realistically represented and are displayed on the screen with location and direction to the nearby road set as described above. Thus, various facilities are arranged on the road accurately in realistic expression, which resulted in enhancement of visibility of the guidance displayed in the navigation system.

In another aspect of the present invention, when there is not sufficient space to display three-dimensional land marks on the screen, three-dimensional land marks are replaced with plane ones. Thus, the land marks can be identified by the users and the most appropriate guidance to be displayed in accordance with the status of the surroundings even when display space is small with crowded various facilities.

BRIEF DESCRIPTION OF THE DRAWINGS

FIG. 4 is a diagram explaining the concept of land mark arrangement in consideration of positional relationship and direction of the land mark to the road and shows the arrangement of land marks around the area of intersection;

DESCRIPTION OF THE PREFERRED EMBODIMENT

Hereinafter, the preferred embodiment is described with reference to drawings. The preferred embodiment explained below is in the case of application of the invention in the navigation system installed on motor vehicles.

Figure 1:
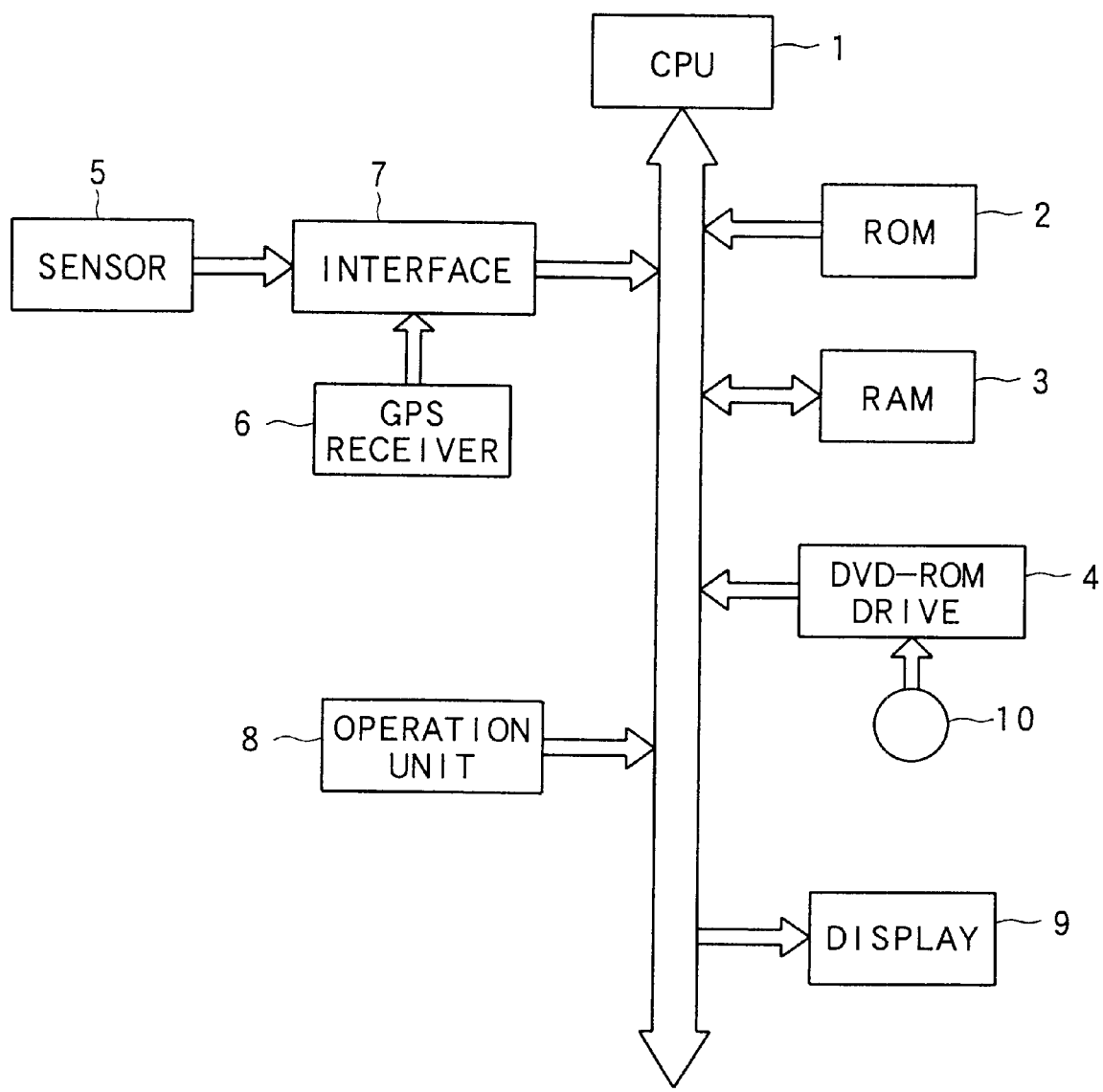
FIG. 1 is a block diagram showing the total configuration of the navigation system in relation to the preferred embodiment.

FIG. 1 is a block diagram that shows total configuration of the navigation system in relation to the preferred embodiment. The navigation system shown in FIG. 1 is composed of a CPU 1, a ROM 2, a RAM 3, a DVD-ROM drive 4, a sensor 5, a GPS receiver 6, an interface 7, an operation unit 8, and a display 9.

FIG. 1, the CPU 1 controls the overall operation of the navigation system. The CPU 1 is connected to each component of the navigation system and reads the control program stored in the ROM 2, and carries out various processing while temporarily storing data which is being processed in the RAM 3.

The DVD-ROM drive 4 has the disk 10 that stores map data in accordance with DVD format, mounted on it and reads required map data. The disk 10 is an information storing media with large memory capacity, for instance, of approximately 4.7 Gbyte in single layer on the single side and stores map data including road linkage data and node data used for displaying guidance as well as various related information.

In the preferred embodiment, various data for displaying land marks in addition to map data are stored in the disk 10. Specifically, data stored are: data which indicates the type of facilities to which the land mark corresponds, location data that shows the location of each land mark, form data to display each land mark, and others. Also, types of land marks includes facilities such as gas stations and convenience stores and different kinds of companies that operate various facilities. Furthermore, the disk 10 stores data which indicates the type of road and the level of priority for each road type, which is explained later, included in the map data when a land mark is displayed.

Then, the sensor 5 is configured including the various sensors required to detect the current location. Specifically, it includes a speed sensor to detect running condition of the vehicle, a traveling distance sensor, an azimuth sensor, and others. The GPS receiver 6 receives radio waves from GPS (Global Positioning System) satellite and outputs position measuring data. The interface 7 works as an interface among the sensor 5, the GPS receiver 6, and the CPU 1, and the CPU 1 calculates location data to indicate the current location of the vehicle based on the position measuring data from the GPS receiver 6 and sensor output from the sensor 5.

The operation unit 8 consists of a key section installed in the main body of the navigation system or a remote controller equipped with the key section, etc. and provides signals to the CPU 1 in accordance with the key entry to perform requested operations in the course of navigation.

The display 9 is a display device used for the operation of navigation and consists, for example, of a CRT, liquid crystal display element, and others. The display 9 displays various forms of map data and a car mark that shows the current location of the vehicle superimposed on it. Also, the guidance with land marks arranged in accordance with the processing described below is displayed in the display 9.

Then, the basic concept of the invention is described with reference to FIGS. 2 to 4. The invention is applicable when the direction and the positional relationship of a land mark with a road need to be taken into consideration at the time of screen display in the navigation system.

Figure 2:
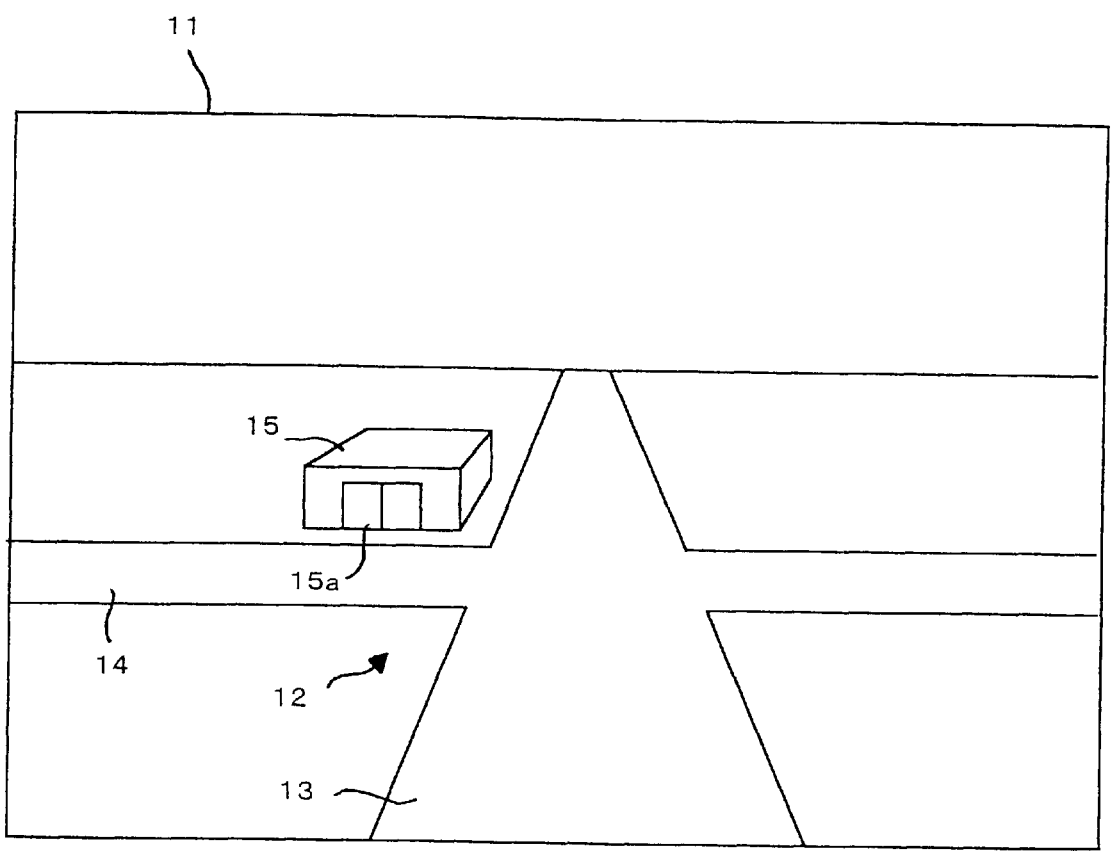
FIG. 2 is a diagram showing an example of display screen using a three-dimensional land mark, which is a basic concept of the invention.

FIG. 2 shows an example of screen display using a three-dimensional land mark when the invention is put to use. As shown in FIG. 2, screen 11 in the display 9 displays three-dimensional image of a vision viewed from the eyes of the driver. Three-dimensional display provides the driver a more realistic image than displaying a plain map, thus making the navigation pleasant when a navigation system is operated.

The screen 11 in FIG. 2 shows an image around intersection 12 which is a crossing point of a road 13 where the vehicle runs on and a crossing road 14. Three dimensional land mark 15 representing a facility such as a convenience store is displayed at a corner of the intersection 12 three-dimensionally. The three-dimensional land mark 15 is presented in a structure with entrance is a as a reference position. The entrance is a is on the road 14. It would be unnatural if the entrance was arranged not to come in contact with the road, therefore the direction needs to be considered when the three-dimensional landmark 15 is to be displayed. Also, because the entrance 15a is arranged to face the road, the location of the landmark 15 on the screen 15 needs to be set accurately. For this purpose, the navigation system in relation to the invention can provide accurate location and direction of the three-dimensional landmark 15 against the nearby road using the method described later.

Figure 3:
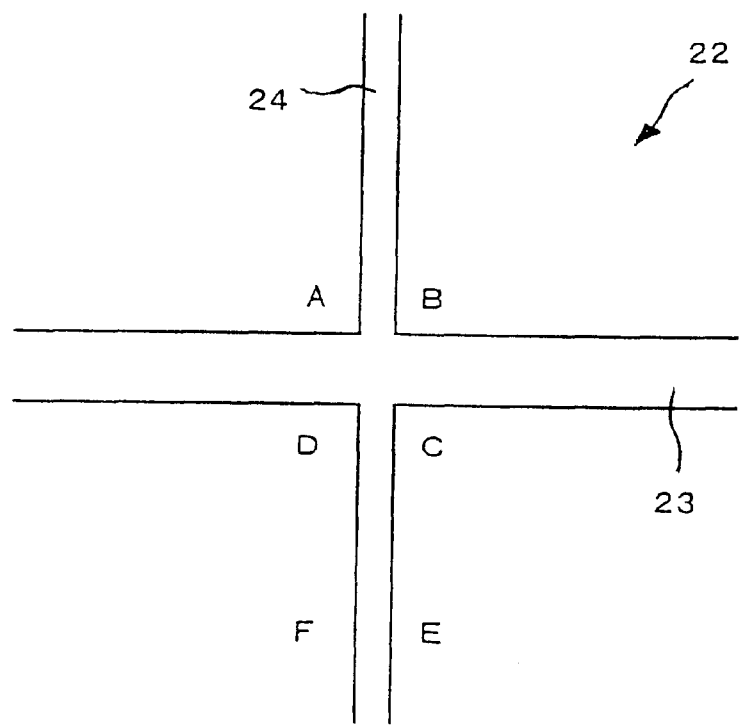
FIG. 3 is a diagram explaining the concept of land mark arrangement in consideration of positional relationship and direction of the land mark to the road and shows the configuration of the land mark and the area around the intersection on the map.

Then, the concept of landmark arrangement in consideration of the location and direction against a road when a landmark is displayed on the screen is explained using FIGS. 3 and 4. In FIG. 2, an example of three-dimensional landmark 15 is shown, however, the invention is applicable regardless of the dimension of the landmark whether it is three-dimensional or plain as long as there is a need for setting the positional relationship and direction against a road. To make the explanation simple, the method of displaying landmarks in relation to the invention is explained below with a plain drawing.

FIG. 3 shows the configuration of the landmark 20 displayed and circumference of the intersection 22 on the map where the landmark 20 is located. The reference position 21 corresponding to the entrance, etc. is set in the landmark 20. Then, the landmark 20 is to be arranged in locations A to E around the intersection 22 of roads 23 and 24. Suppose the road 23 is a wide road like a national highway, and the road 24 is a narrow street. Also, the locations A to D correspond to the four corners of the intersection 22, and the locations B and F correspond to certain locations on the road 24 away from the intersection 22.

FIG. 4 shows a diagram of the landmark 20 arranged in all the locations A to F around the intersection 22. The landmark 20 and the reference position 21 arranged in the locations A to F are represented as landmarks 20A to 20F and reference positions 21A to 21F respectively. Also, each direction in FIG. 4 is shown with an arrow towards N, S, E, and W.

In FIG. 4, landmarks 20A and 20B arranged in the locations A and B in FIG. 3 have reference positions 21A and 21B facing on the road 23 towards the direction of S. Also, landmarks 20C and 20D arranged in locations C and D in FIG. 3 have reference positions 21C and 21D respectively facing on the road 23 towards the direction of N. Also landmark 20E arranged in the location E in FIG. 3 has reference position 21E facing on the road 24 toward the direction of W. Also, landmark 20F arranged in the location F in FIG. 3 has reference position 21F facing on the road 24 towards the direction of E.

As described above, if the location of the landmark 20 changes, the road to which the reference position 21 faces and the direction to which it is arranged also change. Therefore, when the landmark 20 is displayed, the positional relationship of the landmark 20 to a road and the direction to which it is arranged need to be identified before display processing is carried out. Moreover, the landmarks 20A through 20D in the locations A through D in FIG. 4 are arranged on the road 23 instead of on the road 24 in spite of that they are closely located to both roads 23 and 24. This is so because higher priority is set to the major road 23 than to the road 24. With regard to the priority of roads, detailed explanation is given later.

Figure 5:
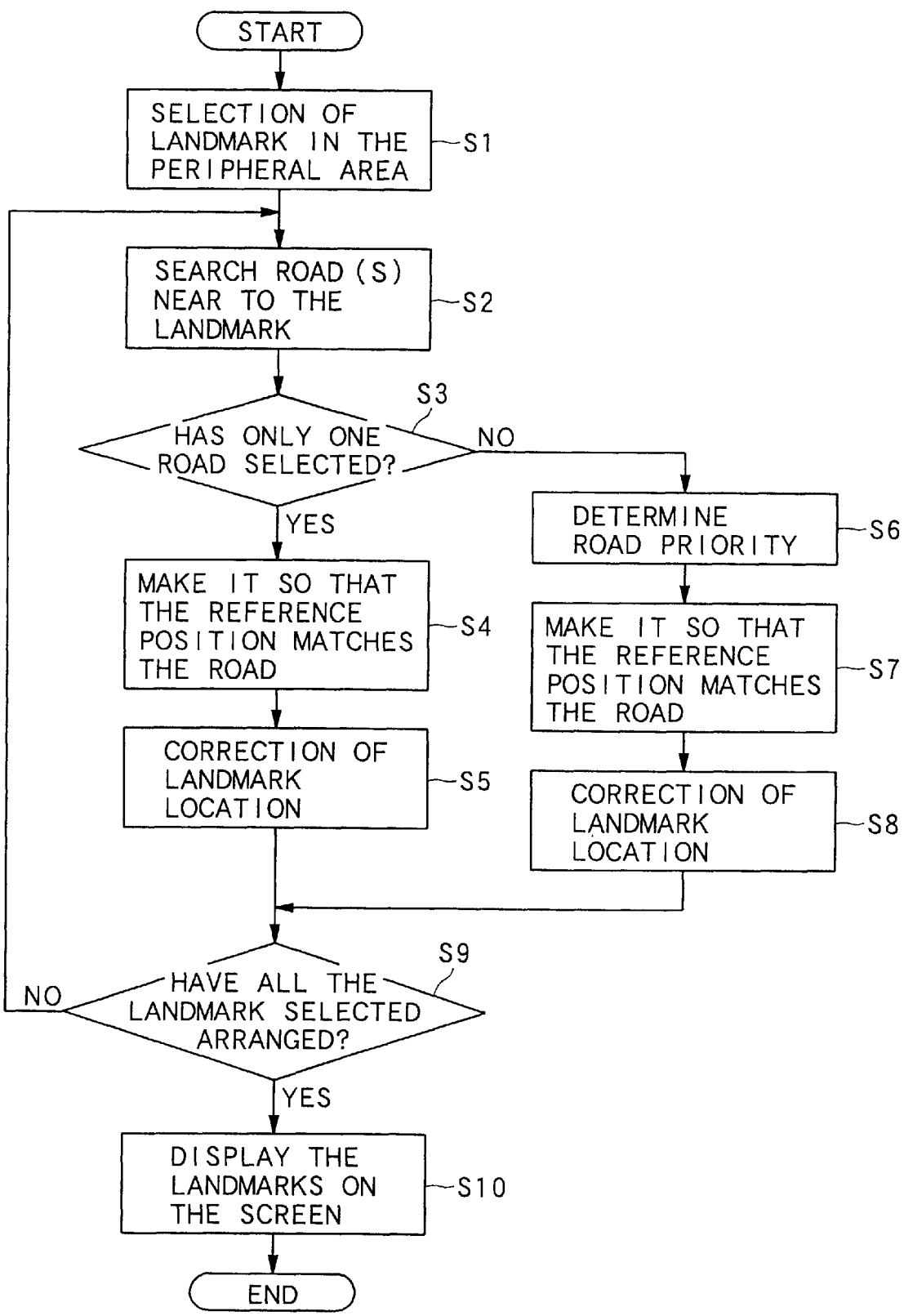
FIG. 5 is a flowchart showing the land mark display processing carried out while the navigation is being activated.

Then, landmark display processing in relation to the preferred embodiment is described with reference to FIGS. 5 to 7. FIG. 5 is a flow chart that shows landmark display processing carried out when the navigation is activated in the navigation system of the preferred embodiment. The processing of FIG. 5 is performed whenever the navigation screen is updated as the current location of the motor vehicle changes.

First of all, the landmark 20 located near the current location is selected in FIG. 5 (Step S1.) The current location data corresponding to the current location of the vehicle is obtained based on the sensor output from the sensor 5 and position measuring data from the GPS receiver 6. Then, the location data of the landmark 20 stored in the disk 10 is compared with the current location data, and the landmark 20 set in a certain distance from the current location is selected (Step S1.) The distance can be set, in general, so that it could go within a display screen.

Then, the roads near to the landmark 20 selected in Step 1 are searched (Step S2.) In other words, the map data near to the area displayed on the screen is referred to and the road that runs within the specified area near the landmark 20 of those included in the map data are selected. And a decision is made whether only one road was selected or multiple roads were selected as a result of Step S2 search (Step S3.) Steps S4 and S5 are performed when the result was that only one road was selected (Step S3; Yes), and Steps S6 to S8 are performed when multiple roads were selected (Step S3; No.)

When the processing goes on to Step S4 and S5, the landmark 20 is arranged on the road searched in Step S2. First of all, the reference position 21 of the landmark 20 is made to correspond with the road searched (Step S4.) In this case, only one road was searched, so the landmark 20 is rotated at an appropriate angle and the direction is adjusted so that the reference position 21 faces the road.

Then, the location of the landmark 20 is corrected based on the relative positional relationship to the road (Step S5.) In other words, the distance between the road and the landmark 20 is not optimized in Step S4, therefore the location of the landmark 20 is to be corrected so that the reference position 21 comes to contact with the road.

Figure 6A:
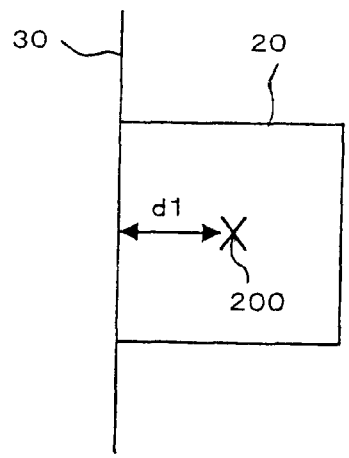
FIGS. 6A–6C are diagrams explaining the location correction processing of land marks and shows three patterns of positional relationship between the road link and the land mark.
Figure 6B:
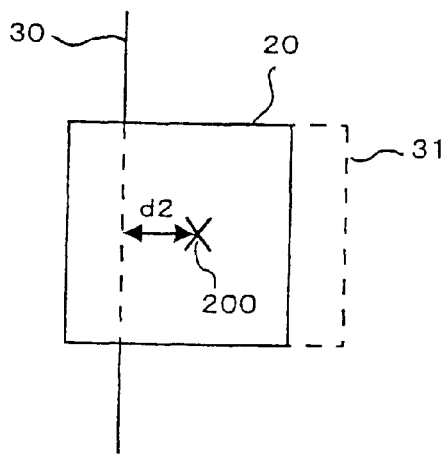
Figure 6C:
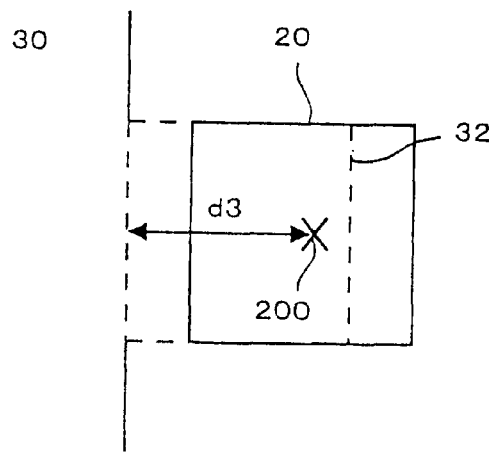

Now, the processing of Step S5 is explained using FIGS. 6A–6C and 7. FIGS. 6A–6C show three patterns of positional relationships between link 30 of the affected road and the landmark 20. In FIG. 6A, the road link 30 is arranged so that it is d1 distance away from the center 200 of the landmark 20. In such situation, the road link 30 comes to contact with the landmark 20, therefore, it is not necessary to correct the location of the landmark 20. Also, the distance d1 between the road link 30 and the center 200 of the landmark 20 can be calculated based on the latitude and longitude included in the respective location data.

On the other hand, the road link 30 is arranged d2 (d2<d1) distance away from the center 200 of the landmark 20 in FIG. 6B. The situation is that the road and the landmark 20 overlap, so the location of the landmark 20 needs to be corrected. Therefore, the landmark 20 is transferred away from the road link 30 to corrected location 31 shown in FIG. 6B with a dashed line so that the arrangement becomes similar to that shown in FIG. 6A.

Also, in FIG. 6C, the road link 30 is distance d3 (d3>d1) away from the center 200 of the landmark 20. In such case, the landmark 20 and the road are too far apart, so the location of landmark 20 needs to be corrected. Therefore, the landmark 20 is transferred toward the road link 30 to the corrected location 31 shown in FIG. 6B with a dashed line so that the arrangement becomes similar to that shown in FIG. 6A.

In the meantime, when the location correction described in FIGS. 6A–6C is done, the landmark 20 may overlap with other roads. FIG. 7 explains the location correction of the landmark 20 assuming such case. An example described below is in the case of overlapping of the landmark 20 with other roads as a result of location correction shown in FIG. 6B.

Figure 7:
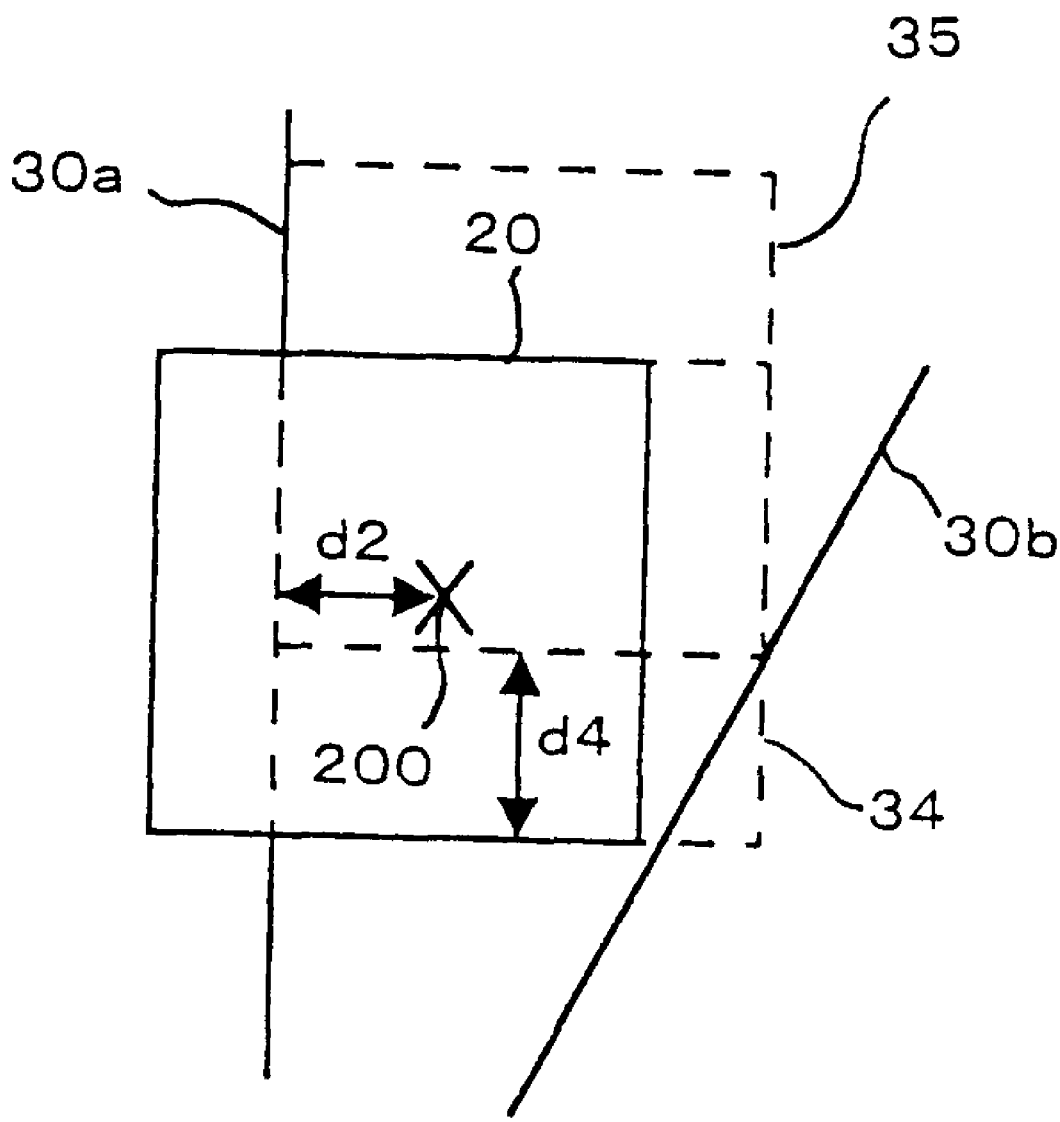
FIG. 7 is a diagram explaining the location correction processing of a land mark and shows another location correction when the land mark overlaps with a road as result of the first location correction.

FIG. 7 shows links 30a and 30b of two roads. Suppose the location of the landmark 20 is corrected as the procedure shown in FIG. 6B not to overlap with the road link 30a, and the landmark 20 is transferred to corrected location 34. Then the arrangement was that the corrected location 34 overlaps with the other road link 30b. So, the landmark 20 is transferred along the road link 30a from the corrected location 34 to corrected location 35 which is distance d4 away form the road link 30b. As a result, the landmark 20 is arranged in a manner that it does not overlap with either the road link 30a or 30b.

Also, it is desirable to take the width of the road into consideration in addition to the road link 30 in the processing carried out in FIGS. 6 and 7 since the road actually has set road width. The map data includes the road width data, so the distance equivalent to the road width can be adjusted when the distance between the road and the landmark 20 is calculated.

Then, going back to FIG. 5, the priority is determined between the road closest to the landmark 20 and the second closest road of two or more roads searched in Step S2 in case the processing goes on to Steps S6 through S8 (Step S6). This is a processing carried out in order to determine the road to which the reference position 21 should face as shown in FIG. 4 when, for instance, the landmark 20 is to be arranged at a corner of the intersection.

The priority, in the embodiment, is determined in accordance with the types of roads and the types of landmark 20. As for the types of roads, basically, the order of priority from the highest to the lowest is: highways, reserved roads for automobiles, national highways, prefectural highways, city roads, and streets. As for the types of landmark 20, police stations and hospitals, for instance, may not necessarily be situated alongside a highway or a reserved road for automobiles. In this case, the order of priority from the highest to the lowest is: national highways, prefectural roads, city roads, streets, reserved roads for automobiles, and then highways. As for the priority for the roads, the order can be preset, or the configuration can be that the setting can be changed as required with a certain operation in the operation unit 8.

In Step S6, a road with the highest priority is selected in accordance with preset priority for roads. In the processing in Step S7 that follows Step S6, processing similar to that described in Step S4 above is carried out, and, in the processing of Step S8, the processing similar to that of Step S5 is carried out. Also, especially in Step S8, the location needs to be corrected so that the landmark 20 does not overlap with roads with lower priority.

Also, in Step S6, when two roads are given the same level of priority, then the road closer to the landmark 20 can be selected. In other words, the length of perpendicular from the center 200 of the landmark 20 to each road is compared, and the road determined to be the closer is selected. Or the road closest to the landmark 20 of multiple roads nearby can be selected without making decisions regarding the priority in Step S6.

When the processing in Step S5 or S8 is terminated, decision is made whether all the Landmarks 20 selected in Step S1 are arranged or not (Step S9). When the result is that there are some remaining landmarks 20 that are yet to be arranged (Step S9: No), the processing in Step S2 is repeated. In the meantime, when all the landmarks 20 are set and arranged (Step S9; Yes), each landmark 20 is drawn and displayed on the screen (Step S10), then the processing in FIG. 5 terminates.

Then, as a modified example of processing of FIG. 5, cases where three-dimensional landmark 15 as shown in the FIG. 2 and general landmarks are used for different purposes are explained. Usually, the three-dimensional landmark 15 requires large display area on the screen when compared to general landmarks. Therefore, it is difficult to display all the buildings with three-dimensional landmarks in a crowded area such as a corner of an intersection. On the other hand, the amount of information obtained from a display screen is reduced if the number of the three-dimensional landmarks 15 to be displayed are limited. So, when the three-dimensional landmarks 15 are arranged in a crowded manner or when the three-dimensional landmarks are arranged in a small area surrounded by roads, etc. it would be effective to replace the three-dimensional landmarks 15 with general landmarks.

In the processing of FIG. 5, for example, inability to secure the space to display the three-dimensional landmark 15 due to the overlapping of roads and other landmarks is determined in Step S8. In this case, a general landmark of similar kind can be arranged to replace the three-dimensional landmark 15. Moreover, when the space cannot be provided even if general landmarks are used as an alternative, the landmarks are not displayed at all. The processing, if performed from the order of closeness to the current location, allows the visibility of the guidance to be improved because, closer a landmark is to the current location, there are higher probability of the three-dimensional landmark 15 to be given priority to be displayed.

The aforementioned style of embodiment shows just an example of how the invention can be applied to a navigation system. Not limited to the above, the invention can be applied in other formations. For instance, the configuration of landmarks and setting of priorities to the roads can be changed according to the form of embodiment how the invention is applied.

Although the case where the navigation system is employed in the vehicle is explained in the embodiment, the present invention is not limited to this and can be applied to a case where the navigation system which can be utilized in a movable body other than vehicles is employed. For example, a feature can be expected wherein the function of the navigation system in the present embodiments is added to a commonly utilized portable telephone unit.

In addition, the present invention can be applied to a case where each of the navigation system that is connected to the Internet. In this case, a navigation server, the map search server, or the like are employed.

The entire disclosure of Japanese Patent Application No. 2000-131640 filed on Apr. 28, 2000 including the specification, claims, drawings and summary is incorporated herein by reference in its entirety.

What is claimed is:

1. A navigation system for displaying guidance in accordance with map data, the system comprising;
    a landmark displaying device for displaying structures corresponding to the map data as landmarks,
    wherein the landmark displaying device sets reference positions in the landmarks and determines the location and direction of a landmark so that the reference position on a map faces to a road nearby.

2. The navigation system according to claim 1, wherein the landmark includes three-dimensional landmarks that three-dimensionally represent structures corresponding to the map data.

3. The navigation system according to claim 1, wherein the reference position is an entrance of the landmark.

4. A navigation system for displaying guidance in accordance with map data, the system comprising:
    a landmark displaying device for displaying structures corresponding to the map data as landmarks,
    wherein the landmark displaying device sets reference positions in the landmarks, determines the location and direction of a landmark so that the reference position faces to a road nearby, and when multiple roads exist in areas near to the landmark, selects a road closest to the landmark.

5. The navigation system according to claim 4, wherein the landmark includes three-dimensional landmarks that three-dimensionally represent structure corresponding to the map data.

6. The navigation system according to claim 5, the landmark displaying device replaces a three-dimensional landmark with a plain landmark when sufficient room to display the three-dimensional landmark cannot be ensured.

7. A navigation system for displaying guidance in accordance with map data, the system comprising:
    a landmark displaying device for displaying structures correspondence to the map data as landmarks,
    wherein the landmark displaying devices sets reference positions in the landmarks, determines the location and direction of a landmark so that the reference position faces to a road nearby, sets a priority in accordance with the types of the roads, and when multiple roads exist in areas near to the landmark, selects a road with the highest priority.

8. The navigation system according to claim 7, wherein the landmarks include three-dimensional landmarks that three-dimensionally represent structures corresponding to the map data.

9. The navigation system according to claim 8, the landmark displaying device replaces a three-dimensional landmark with a plain landmark when sufficient room to display the three-dimensional landmark cannot be ensured.

10. A navigation system for displaying guidance in accordance with map data, the system comprising;
    a landmark displaying device for displaying structures corresponding to the map data as landmarks, wherein the landmark displaying device sets reference positions in the landmarks and determines the location and direction of a landmark so that the reference position faces to a road nearby, the landmarks includes three-dimensional landmarks that three-dimensionally represent structures corresponding to the map data, and the landmark displaying device replaces a three-dimensional landmark with a plain landmark when sufficient room to display the three-dimensional landmark cannot be ensured.

11. A computer-readable medium on which is stored a data structure comprising:

road data for providing map displays;

landmark data for displaying landmarks on the map displays; and road priority data for use in a data processing operation for determining positional relationships of landmarks with roads on the map displays.

12. The computer-readable medium according to claim 11, wherein the landmark data includes reference positions for one or more of the landmarks and the data processing operation determines the positional relationships of the reference positions of the landmarks with roads on the map displays.

13. The computer-readable medium according to claim 12, wherein the reference positions for one or more of the landmarks are landmark entrances.

14. The computer-readable medium according to claim 11, wherein the road data comprises road width data.

15. The computer-readable medium according to claim 11, wherein the landmark data comprises data for displaying three-dimensional landmarks on the map displays.

16. The computer-readable medium according to claim 11, wherein the road priority data comprises road priorities for different road types.

17. The computer-readable medium according to claim 11, comprising an optical disk.

18. A navigation system comprising:

a display;

a processing system displaying maps on the display, wherein at least one map generated by the processing system includes a landmark comprising a reference position and the processing system determines a positional relationship of the reference position of the landmark to a road on the at least one map.

19. The navigation system according to claim 18, wherein the processing system determines the positional relationship based on road priority data.

20. The navigation system according to claim 19, wherein the road priority data is pre-set.

21. The navigation system according to claim 19, wherein the road priority data is changeable in accordance with inputs to an operation unit.

22. The navigation system according to claim 19, wherein the processing system determines whether to display the landmark as either a three-dimensional or two-dimensional landmark.

23. The navigation system according to claim 19, comprising a vehicle navigation system.

24. The navigation system according to claim 19, comprising a portable telephone navigation system.

* * * * *